(12) United States Patent
Shepherd et al.

(10) Patent No.: US 11,927,938 B2
(45) Date of Patent: Mar. 12, 2024

(54) GENERATING OBJECT MODEL SLICES (71) Applicant: HEWLETT-PACKARD DEVELOPMENT COMPANY, L.P., Houston, TX (US)

(72) Inventors: Josh Shepherd, Vancouver, WA (US); Matthew A Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1521 days.

(21) Appl. No.: 16/075,628

(22) PCT Filed: Jul. 10, 2017

(86) PCT No.: PCT/US2017/041304
§ 371 (c)(1),
(2) Date: Aug. 4, 2018

(87) PCT Pub. No.: WO2019/013742
PCT Pub. Date: Jan. 17, 2019

(65) Prior Publication Data
US 2021/0208566 A1    Jul. 8, 2021

(51) Int. Cl.
*G05B 19/4099* (2006.01)
*B29C 64/153* (2017.01)
(Continued)

(52) U.S. Cl.
CPC ........ *G05B 19/4099* (2013.01); *B29C 64/386* (2017.08); *B33Y 50/00* (2014.12);
(Continued)

(58) Field of Classification Search
CPC . G05B 19/4099; B29C 64/153; B29C 64/386; G06K 5/1849; G06K 15/021; B33Y 50/00
See application file for complete search history.

(56) References Cited

U.S. PATENT DOCUMENTS 7,307,630 B2    12/2007 Lessieux
10,318,654 B2 *  6/2019 Shtilerman ........... B29C 64/386
(Continued)

FOREIGN PATENT DOCUMENTS

CN    105121134 A    12/2015
CN    105939837 A    9/2016
(Continued)

OTHER PUBLICATIONS

Gregori, Rodrigo M. M. H., et al., "Slicing Triangle Meshes: An Asymptotically Optimal Algorithm", 2014 14th International Conference on Computational Science and Its Applications, IIEE, Jun. 30, 2014, pp. 252-255, XP832699157, DOI: 10.1109/ICCSA.2014.58.

(Continued)

*Primary Examiner* — Robert E Fennema
*Assistant Examiner* — Yvonne Trang Follansbee
(74) *Attorney, Agent, or Firm* — Michael Dryja (57) ABSTRACT

In an example, a method includes receiving, at a processor, a data comprising a model of an object to be generated in additive manufacturing. The data comprises object model data representing an object model as a plurality of initial polygons and object property data associated with the initial polygons. The method may comprise generating a representation of a slice of the object model defined between two planes and generating a plurality of polygons to represent the slice of the object model. A mapping between the object property data and the generated plurality of polygons may also be generated.

17 Claims, 4 Drawing Sheets

(51) Int. Cl.
*B29C 64/386* (2017.01)
*B33Y 50/00* (2015.01)
*G06K 15/02* (2006.01)

(52) U.S. Cl.
CPC ....... *G06K 15/021* (2013.01); *G06K 15/1849* (2013.01); *B29C 64/153* (2017.08); *G05B 2219/35134* (2013.01); *G05B 2219/49023* (2013.01)

(56) References Cited

U.S. PATENT DOCUMENTS

| | | |
|---|---|---|
| 2004/0017369 A1 | 1/2004 | Hultgren et al. |
| 2008/0030497 A1 | 2/2008 | Hu et al. |
| 2009/0184960 A1 | 7/2009 | Carr et al. |
| 2011/0087350 A1 | 4/2011 | Fogel et al. |
| 2015/0269282 A1* | 9/2015 | Nelaturi .................. G06F 30/17 700/98 |
| 2016/0019319 A1 | 1/2016 | Shtilerman |
| 2016/0349724 A1 | 12/2016 | Cortes et al. |
| 2017/0032561 A1 | 2/2017 | Choi et al. |
| 2017/0050381 A1* | 2/2017 | Minardi ................ B29C 64/393 |
| 2017/0061036 A1 | 3/2017 | Schmidt et al. |
| 2017/0148182 A1 | 5/2017 | Yoshida |
| 2018/0108176 A1* | 4/2018 | Yonesaka ................ G06T 19/20 |

FOREIGN PATENT DOCUMENTS

| | | |
|---|---|---|
| KR | 20100012724 A | 2/2010 |
| WO | 2016/119879 A1 | 8/2016 |
| WO | 2016/122634 A1 | 8/2016 |
| WO | WO-2016169615 A1 | 10/2016 |

OTHER PUBLICATIONS

Gupta, Vikas, et al., "Slice Generation and Data Retrieval Algorithm for Rapid Manufacturing of Heterogeneous Objects", Computer-Aided Design and Applications, vol. 11, No. 3, May 4, 2014, pp. 255-262, XP855733856, US ISSN: 1686-4360, DOI: 10.1080/16864360.2014.863483.

Sabourin, Emmanuel, et al., "Adaptive Slicing Using Stepwise Uniform Refinement", Rapid Prototyping Journal, vol. 2, No. 4, 1996, pp. 20-26.

Ding et al., "Automatic Multi-direction Slicing Algorithms for Wire Based Additive Manufacturing", Robotics and Computer-Integrated Manufacturing, vol. 37, Sep. 18, 2015, pp. 139-150.

* cited by examiner

GENERATING OBJECT MODEL SLICES

BACKGROUND

Three-dimensional (3D) printing is an additive manufacturing process in which three-dimensional objects may be formed, for example, by the selective solidification of successive layers of a build material. The object to be formed may be described in a data model. Selective solidification may be achieved, for example, by fusing, binding, or solidification through processes including sintering, extrusion, and irradiation. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In addition to a fusing agent, in some examples, a print agent may comprise a coalescence modifying agent, which acts to modify the effects of a fusing agent or energy applied for example by inhibiting, reducing or increasing coalescence or to assist in producing a particular finish or appearance to an object, and such agents may therefore be termed detailing agents. A property modification agent, for example comprising a dye, colorant, a conductive agent, an agent to provide transparency or elasticity or the like, may in some examples be used as a fusing agent or a modifying agent, and/or as a print agent to provide a particular property for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Figure 1:
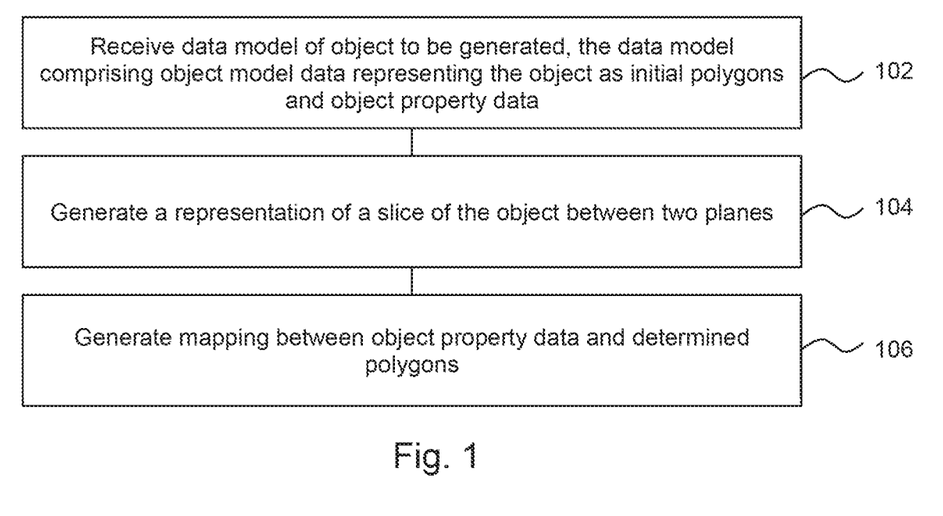
FIG. 1 is an example of a method for determining a representation of a slice of an object model.

FIG. 1 shows an example of a method which may be a computer implemented method, for example carried out using at least one processor, and may comprise a method of determining a representation of a slice of an object.

Block 102 comprises receiving, at a processor, a data model of an object to be generated in additive manufacturing, the data model comprising object model data representing the object as a plurality of initial polygons and object property data associated with the initial polygons. The data may for example be held in or received from a memory, received over a network, received over a communications link or the like. The object model data may define a three-dimensional geometric model of at least a portion of the model object, including the shape and extent of all or part of an object in a three-dimensional co-ordinate system, e.g. the solid portions of the object. The data model may for example represent the object (including the interior), or the surface(s) of the object, as a plurality of polygons, in what may be described as a 'mesh model'. The polygons may be of a common type, for example, comprising triangles. The object model data may for example be generated by a computer aided design (CAD) application.

Object properties may be specified in the object property data for example to define at least one object property for the three-dimensional object to be generated. In one example, the object property data may comprise any or any combination of visual and/or mechanical properties, for example a color, flexibility, elasticity, rigidity, surface roughness, porosity, inter-layer strength, density, conductivity and the like for at least a portion of the object to be generated. Object property data may define multiple object properties, and/or the object properties may vary over the object, for example such that different portions of an object may have multiple properties which may differ between portions.

In some examples the object properties may be specified as a 2D or 3D map of a property over the surface of the object. This may for example comprise a 'texture map'. This may for example comprise a 'texture map'. A texture map may comprise a 2D image file that can be applied to a 3D model to add color, texture, or other properties like glossiness, reflectivity, conductivity, transparency, strength, or the like. In other examples, 3D texture maps may be provided.

Texture maps may correspond to an 'unwrap' model of a mesh surface, in which the polygons are arranged so as to lie in a 2D plane, and may be described by a uv coordinate system (as compared to the xyz coordinate system used to describe the object in 3D). Therefore a texture map may be associated with the surface so as to correspond with the uv coordinates of an unwrapped 3D model. In other examples, at least one location=of the object interior may be associated with a coordinate in the texture map.

For example, coordinates in a 2D property map may be associated with the vertices (i.e. corners) of the polygons. In some examples, a model of an object may be expressed in two parts: (a) object model data representing the object as a plurality of initial polygons, i.e. a mesh, which has 3D rectilinear coordinates in xyz and (b) object property data, e.g. bitmap(s), which have 2D rectilinear coordinates in uv (the uv space may be effectively the bitmap xy space, but is termed uv to avoid confusion with the 3D coordinate system).

In one example, the polygon mesh is a triangular mesh representing a surface of the object and each triangle in the mesh has three vertices and six pieces of information—the xyz coordinates v0, v1 and v2 (the location of the polygon vertices in 3D space) and the uv coordinates uv0, uv1, and uv2 (the location of the vertices in the 2D space of the bitmap(s)). The uv coordinates may not have the same shape as the xyz coordinates, they can be three arbitrary points (or even the same point(s)) on the bitmap(s). Further, they can be independently determined for each polygon, where one polygon's uv coordinates in general don't affect any other polygon's uv coordinates. In this way, the properties at the vertices are given by the uv coordinates. For the remainder of a given polygon (the edges and interior), these properties may be derived, for example interpolated (e.g. linearly interpolated), from the three uv vertices.

While the example of a triangle has been used here, the mesh may be based on a different polygon, for example comprising a tetrahedral mesh (which comprises polygon faces). In such a mesh, the properties may again be defined at the vertices (for example in a 3D texture map).

In other examples, properties may be mapped to a polygon mesh in a different manner, for example, each polygon may have a particular fixed property, or the like.

Block 104 comprises generating, by the processor, a representation of a slice of the object model defined between two planes. The planes may be infinitesimally thin. In some examples, the planes lie in an xy plane, wherein manufacture of the object to be carried out by adding xy layers in a z direction. In some examples, the planes define a slice of the object model to be generated in a single layer in layer by layer manufacturing.

In some examples, the slice of the object model may be one 'voxel' thick. In some examples of additive manufacturing, three-dimensional space may be characterised in terms of such voxels, i.e. three-dimensional pixels, wherein each voxel occupies or represents a discrete volume. In some examples, the voxels are determined bearing in mind the print resolution of a print apparatus, such that each voxel represents a volume which may be uniquely addressed when applying print agents, and therefore the properties of one voxel may vary from those of neighbouring voxels. In other words, a voxel may correspond to a volume which can be individually addressed by a print apparatus (which may be a particular print apparatus, or a class of print apparatus, or the like) such that the properties thereof can be determined at least substantially independently of the properties of other voxels. For example, the 'height' of a voxel may correspond to the height of a layer of build material. In some examples, the resolution of a print apparatus may exceed the resolution of a voxel. In general, the voxels of an object model may each have the same shape (for example, cuboid or tetrahedral), but they may in principle differ in shape and/or size. In some examples, voxels are cuboids, for example cubes, based on the height of a layer of build material. In some examples, in processing data representing an object, each voxel may be associated with properties, and/or then to print instructions, which apply to the voxel as a whole.

Block 104 may comprise generating a plurality of polygons to represent the slice of the object model. This may be thought of a 're-meshing' of the slice. The polygons may have common attributes for the initial polygons, i.e. may be determined so as to fulfil a common set of conditions. For example, the polygons may be of a common type as the initial polygons; i.e., where the original mesh of polygons represents the surfaces of the object as triangles, the 're-mesh' may represent the surfaces of the slice as triangles. In another example, where the original mesh is formed using a particular projection or coordinate system (e.g. a cylindrical projection, or a planar projection, or the like, for example using a rectilinear, cylindrical or spherical coordinate system), the mesh of the slice may be determined using the same projection.

Moreover, the 're-meshing' may preserve features (e.g. vertices and/or edges) of the initial mesh in meshing the slice. For example, a 2-manifold (or 2D) mesh immersed in 3D space can be thought of as having elements of zero dimensions, or 0D (i.e. the vertices), one dimension 1D (i.e. edges) and two dimensions, 2D (i.e. faces). In some examples, all original vertices (0D), edges (1D), and faces (2D) of the original mesh are maintained, but they may be segmented. in one example, there may be three 'rules' to the re-meshing process:

(i) where a vertex (0D) is intersected by a plane, the vertex is retained, (ii) where an edge (1D) is intersected by a plane, the edge is segmented, and a vertex (0D) is added, and (iii) where a face (2D) is intersected by a plane, the face is segmented and an edge (1D) is added.

Other meshes (e.g. a 3-manifold mesh such as a tetrahedral mesh) may be treated in a similar manner. Examples in relation to re-meshing are described in relation to FIG. 2 below.

Block 106 comprises generating a mapping between the object property data and the generated plurality of polygons. In some examples, at least one of the generated polygons may be an initial polygon. For example, whereas the object property data may have originally been determined to associate locations in a 2D representation of object property data to corners (vertices) of the polygons, block 106 may comprise generating a mapping between locations in the 2D representation and the vertices of the new polygons of the slice.

In one example, as set out above, a 2D representation of property data may comprise a bitmap having a uv coordinate system, In such an example, the properties may be given at the polygon vertices, and then interpolated for all other points (e.g., for the three edges or the face of a given polygon, these are linearly interpolated from the vertices). Since the uv coordinates are stated at vertices, generating a new mapping in block 106 may comprise generating an mapping for just new vertices which have been created in a re-meshing process of block 104, This may for example comprise determining an interpolation of a property between an original edge's vertices (which may have been associated with two uv coordinates and therefore property specifications) according to the position of the new vertex added (e.g. a weighted combination of the two property specification given the distance of the new vertex from each original vertex). In such an example, the result is the same uv coordinate result that point on the edge would have even if it had not been segmented, which therefore give equivalent properties at that point: in other words, in such an example, the model is not substantively changed by the segmentation, but explicit mappings are now held at both the original vertices and any new vertices formed in the 'slicing' operation.

Figure 2:
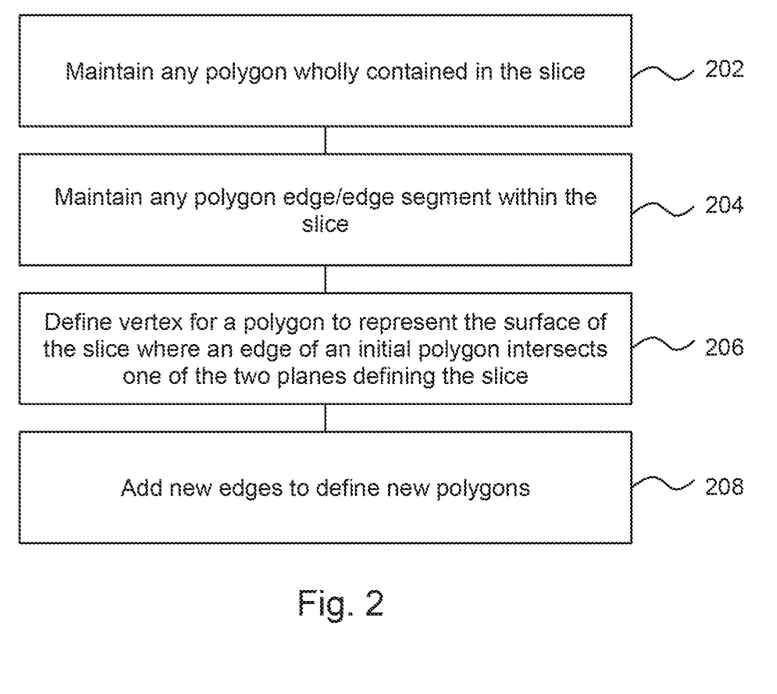
FIG. 2 is an example of a method of generating polygons representing a slice of an object model.

FIG. 2 is an example of carrying out block 104 of FIG. 1. In this example, the method comprises, in block 202, maintaining any initial polygon which is wholly contained within the slice. Block 204 comprises maintaining any polygon edge or edge segment which is contained within the slice. Maintaining existing features of an initial mesh may reduce a computational burden in the re-meshing process. Block 206 comprises defining a vertex for a polygon to represent the slice where an edge of an initial polygon intersects one of the two planes defining the slice. Block 208 comprises adding new edges to define new polygons.

Figure 3:
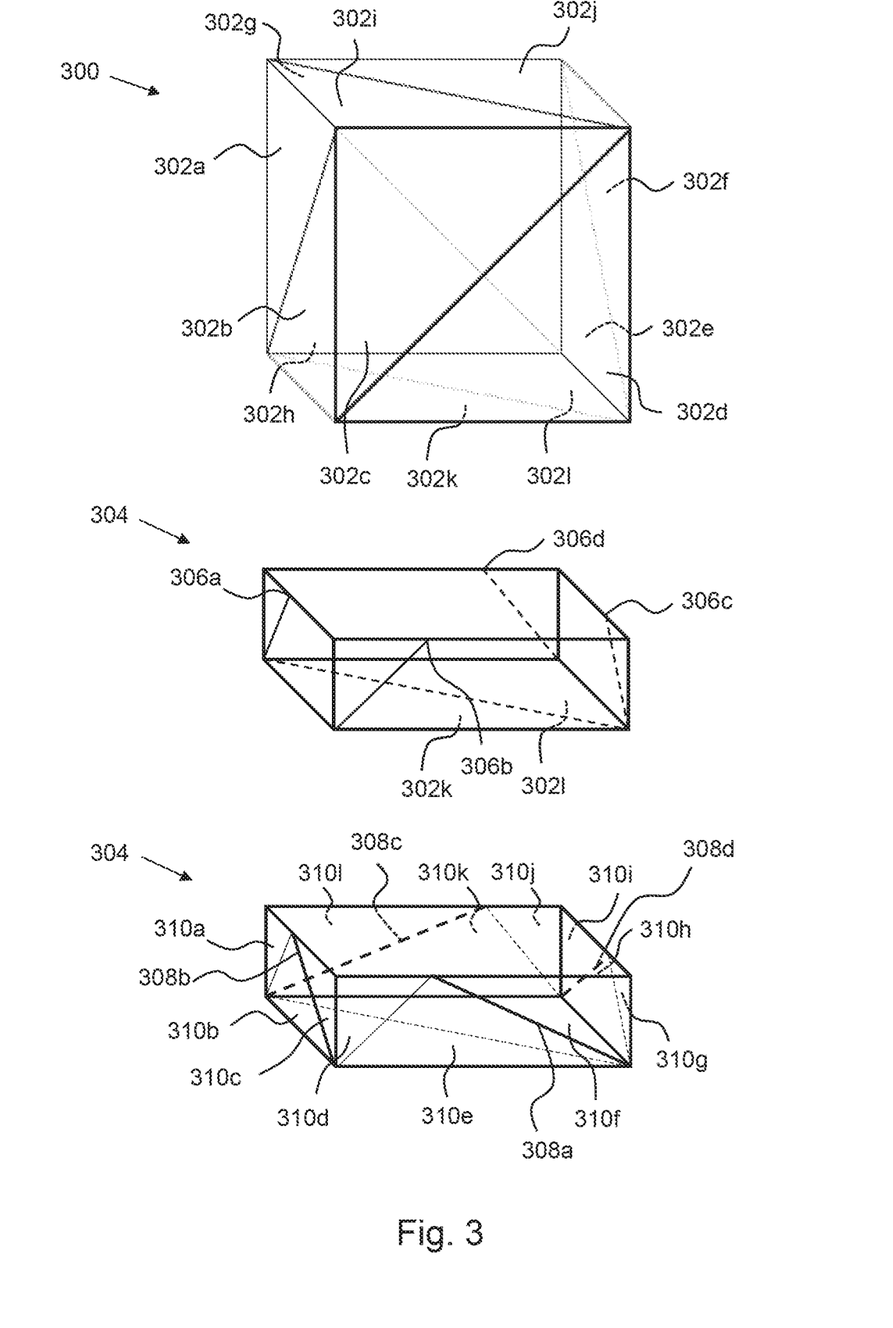
FIG. 3 is an example of an object and an object model slice formed according to an example of the method of FIG. 2.

This method is shown schematically in FIG. 3, in which the original object model to be sliced is a cube 300. In this case, a triangular mesh is used to define the surfaces of the object model and therefore each of the six faces of the cube 300 is represented by two triangles 302a-l.

A slice 304 of the object is formed between two planes. In this example, the slice is the lowermost slice of the object model and therefore includes the bottom face of the cube 300. As the triangles 302k and 302l of this face are wholly contained within the slice 304, they are maintained. However, the triangles and edges on the faces have been transected by a plane and therefore new triangles may be formed, in this example by defining new vertices 306a-306d where an edge of an initial triangle intersects a plane, and adding new edges 308a-308d to define new triangles 310a-l.

Thus in this example, the slice 304 is represented by a total of fourteen triangles, two of which are unchanged compared to the initial mesh, All edges of the original mesh which are contained within the slice 304 are preserved. If however, the next slice up was considered, the diagonal edge of each of the initial triangles would be transected twice, leading to the creation of two new vertices per side. Such a slice would be represented by sixteen triangles (four on each side, but being 'open' on the top and bottom faces).

Figure 4:
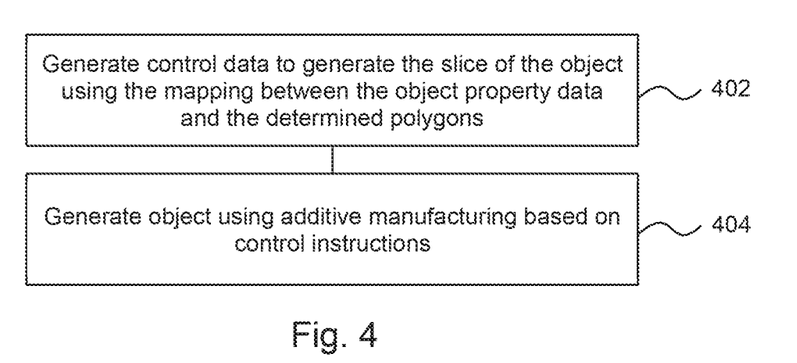
FIG. 4 is an example of a method of generating an object.

It may be noted that one way of defining a solid object would be to consider a series of infinitesimal planes which are considered individually. However, this may miss surfaces (in particular if done in increments of the object slice height), and therefore a 2D representation of the properties (e.g. texture mapping and the like). In such a method, the properties assigned to voxels may be incorrect, and the object may not appear as intended. The methods set out herein consider such a series of infinitesimal planes in pairs and the volume between their planar intersections, and in turn addresses the volumes between the planes, FIG. 4 is an example of a method of generating an object which may be carried out for example after the method of FIG. 1.

Block 402 comprises generating control data to generate the slice of the object model using the mapping between the object property data and the determined polygons, This may for example comprise 'voxelising' the slice and associating properties with each voxel, for example by interpolation of property values specified for vertices of the mesh of the slice. In other words, in some such examples, object properties may be specified at the voxel level, For example, a voxel at a given location may have at least one specified property: for example, it may have a particular color, transparency, conductivity, strength or the like. Properties need not be specified for all voxels, and in some examples at least some voxels may be associated (for example in the absence of a specification of a property) with a default property or combination of properties, For example, in generating control data, properties or combinations thereof may be mapped, via a look-up table or the like, to a print agent or print agent combination to apply to a physical location corresponding to the voxel of the object model. In some examples, the control data may also comprise specification of build material, processing times, temperatures and the like. In some examples, a halftoning process may be used to determine where print agent drops may be applied.

By remapping the properties to a slice, processing of the slices may be carried out in parallel, or in some examples, as printing of previous object layers is on-going. In other words, as the data representing the object may be expressed in broadly self-contained 'slices', each of these slices may be processed independently of another, leading to efficient use of processing resources. In some examples, polygons with associated property data may be stored separately from one another, for example with an indication of their position within an object (e.g. their Z-level) to provide for an efficient ordered processing of the data which may be carried out even during object manufacture (i.e. data for upper layer may be processed while a lower layer is being fabricated). Efficient processing may be achieved by retaining features of an initial polygon mesh, and properties stated in a 2D format such as colors and the like may be mapped consistently and effectively to the slice, without undue distortion of the original model.

Block 404 comprises generating an object using additive manufacturing based on the control instructions. For example, this may comprise forming successive layers of build material on a print bed and applying print agents according to the control instructions for that layer and exposing the layer to radiation, resulting in heating and fusion of the build material in at least one region thereof.

Figure 5:
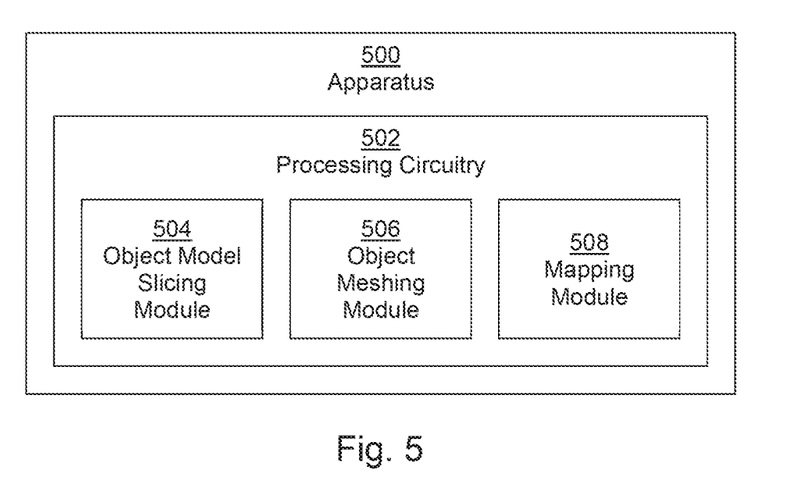
FIGS. 5 and 6 are examples of apparatus for additive manufacturing processes.

FIG. 5 is an example of an apparatus 500 comprising processing circuitry 502. In this example, the processing circuitry 502 comprises an object model slicing module 504, an object meshing module 506 and a mapping module 508.

In use of the apparatus 500, the object model slicing module 504 determines a slice of an object represented in data modelling the object, the object meshing module 506 determines a mesh of polygons representing the slice and the mapping module 508 associates object properties with the polygons of the mesh of polygons. As such, the processing circuitry 502 may carry out the methods of FIGS. 1 and/or 2 above. Each of the modules 504, 506, 508 may be provided by a processor executing machine-readable instructions.

In some examples, the object model slicing module 504 determines the surfaces of a slice of an object defined between two planes, where the planes are separated by a distance equivalent to the height of a layer in layer-by-layer additive manufacturing processing. In some examples, the object is represented in data modelling the object (in some examples, the object's surface(s)) as a plurality of initial polygons (i.e. a mesh of polygons) and the object meshing module 506 is operable to re-mesh the slice. Such re-meshing may comprise preserving features (e.g. edges and/or vertices) of the initial polygons within the slice (for example as described in relation to FIGS. 2 and 3 above).

Figure 6:
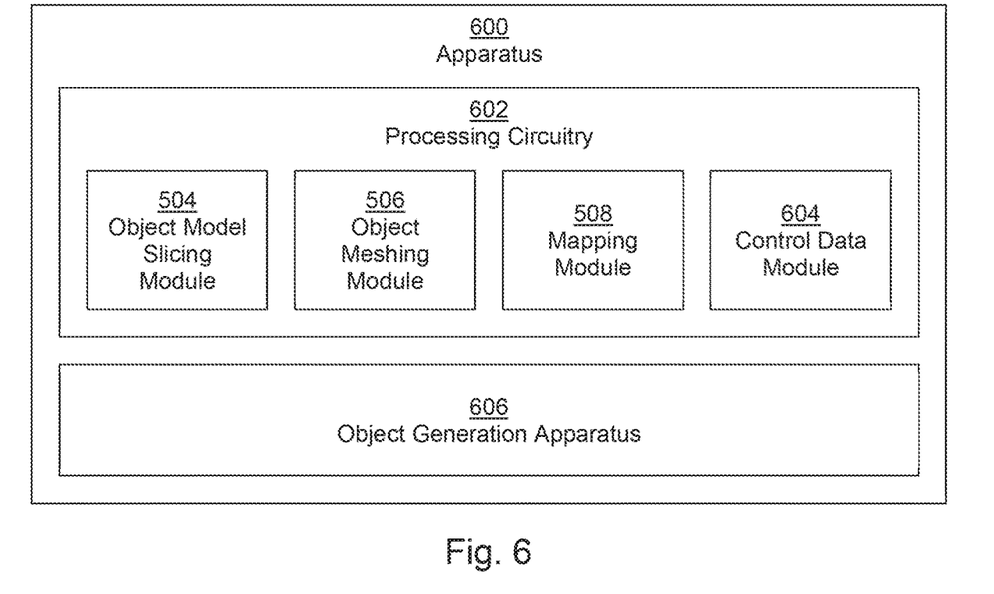

FIG. 6 shows an example of an apparatus 600 comprising processing circuitry 602 which comprises the object model slicing module 504, object meshing module 506 and mapping module 508 of FIG. 5, and further comprises a control data module 604 to generate control data to generate the slice of the object model. The apparatus 600 further comprises object generation apparatus 606 to generate the object in a plurality of layers corresponding to respective slices according to the generated control data.

In use of the apparatus 600, the control data module 604 may generate control data for generating an object based on the representation of the object as a plurality of discrete voxels, For example, properties or combinations associated with voxels may map, via a look-up table or the like to a print agent or print agent combination to apply to a location corresponding to the voxel. In some examples, a halftoning process may be used to determine where print agent drops may be applied within that location.

The object generation apparatus 606 is to generate the object according to the generated control data, and may to that end comprise additional components such as a print bed, build material applicator(s), print agent applicator(s), heat sources and the like, not described in detail herein.

In some examples, the processing circuitry 502, 602 may carry out at least one block of FIG. 1 or FIG. 2, or block 402 of FIG. 4.

Figure 7:
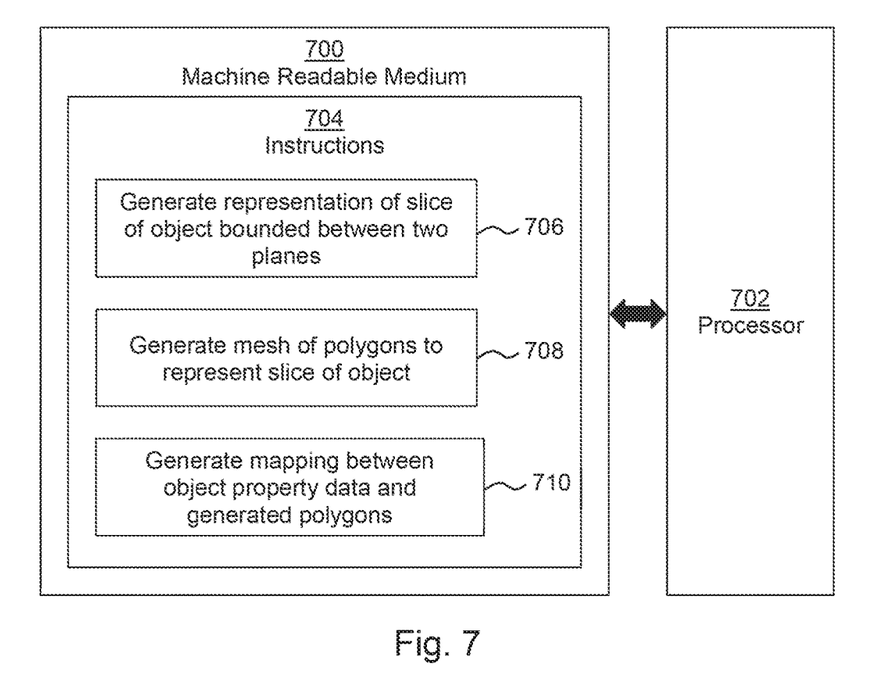
FIG. 7 is an example of a machine readable medium in association with a processor.

FIG. 7 is an example of a tangible, non-transitory, machine readable medium 700 in association with a processor 702. The machine readable medium 700 stores instructions 704 which may be non-transitory and which, when executed by the processor 702, cause the processor 702 to carry out processes. The instructions 704 comprise instructions 706 to generate from object model data and object property data for an object to be generated in additive manufacturing, a representation of a slice of the object model bounded by two planes, instructions 708 to generate a mesh of polygons to represent the slice of the object model, and instructions 710 to generate a mapping between the object property data and the determined polygon mesh.

In some examples, the instructions 704 may comprise instructions to cause the processor 702 to generate the mesh of polygons utilising any edges and vertices of a mesh previously defined for the object which lie within the slice.

In some examples, the instructions 704 may comprise instructions to cause the processor 702 to generate control instructions to generate an object using the generated mesh of polygons and the mapping.

In some examples, the instructions 704 may comprise instructions to cause the processor 702 to carry out at least one block of FIG. 1 or FIG. 2, or block 402 of FIG. 4. In some examples, the instructions 704 may comprise instructions to cause the processor 702 to act as a module of FIG. 5 or FIG. 6.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the object model slicing module 504, object meshing module 506 and mapping module 508 and the control data module 604) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A non-transitory machine readable medium comprising instructions which when executed by a processor cause the processor to:
   generate from object model data and object property data for an object to be generated in additive manufacturing, a representation of a slice of the object model bounded by two planes, the object model data comprising a plurality of initial polygons;
   generate a mesh of polygons to represent the slice of the object model based on the initial polygons by:
      defining a vertex of a slice polygon where a vertex of an initial polygon intersects a plane of the two planes;

defining a vertex of the slice polygon where an edge of an initial polygon intersects a plane of the two planes;

defining an edge of the slice polygon where a face of an initial polygon intersects a plane of the two planes;

maintaining any initial polygon which is wholly contained within the slice polygon; and maintaining any initial polygon edge or edge segment within the slice polygon;

generate a mapping between the object property data and the generated polygons; and cause the object to be generated via additive manufacturing based on the mapping between the object property data and the generated polygons.

2. The non-transitory machine readable medium according to claim 1, wherein the mesh of polygons is generated utilizing any edges and vertices of a mesh representing the object defined in the object model data which lie within the slice.

3. The non-transitory machine readable medium according to claim 1, wherein when executed by the processor the instructions cause the processor to further:

generate control instructions to generate the object using the generated mesh of polygons and the mapping, wherein the object is caused to be generated via additive manufacturing by causing an additive manufacturing apparatus to execute the control instructions.

4. The non-transitory machine readable medium according to claim 1, wherein the object property data comprises a mechanical property of the object to be generated.

5. The non-transitory machine readable medium according to claim 1, wherein the slice is one voxel thick.

6. The non-transitory machine readable medium according to claim 3, wherein the control instructions associate the object property data with each of a plurality of voxels.

7. The non-transitory machine readable medium according to claim 6, wherein the object property data is associated with each voxel in that object properties from vertices of the polygons representing the slice such that each voxel is associated with an object property.

8. The non-transitory machine readable medium according to claim 6, wherein the voxels that define the object to be generated have different shapes.

9. The non-transitory machine readable medium according to claim 3, wherein the control instructions are is generated for an upper layer as a lower layer is being generated.

10. A method comprising:

generating, by a processor and from object model data and object property data for an object to be generated in additive manufacturing, a representation of a slice of the object model bounded by two planes, the object model data comprising a plurality of initial polygons;

generating, by the processor, a mesh of polygons to represent the slice of the object model based on the initial polygons by:

defining a vertex of a slice polygon where a vertex of an initial polygon intersects a plane of the two planes;

defining a vertex of the slice polygon where an edge of an initial polygon intersects a plane of the two planes;

defining an edge of the slice polygon where a face of an initial polygon intersects a plane of the two planes;

maintaining any initial polygon which is wholly contained within the slice polygon; and maintaining any initial polygon edge or edge segment within the slice polygon;

generating, by the processor, a mapping between the object property data and the generated polygons; and causing, by the processor, the object to be generated via additive manufacturing based on the mapping between the object property data and the generated polygons.

11. The method according to claim 10, wherein the mesh of polygons is generated utilizing any edges and vertices of a mesh representing the object defined in the object model data which lie within the slice.

12. The method according to claim 10, further comprising:

generating, by the processor, control instructions to generate the object using the generated mesh of polygons and the mapping, wherein the object is caused to be generated via additive manufacturing by causing an additive manufacturing apparatus to execute the control instructions.

13. A system comprising:

a processor; and a memory storing instructions executable by the processor to:

generate, from object model data and object property data for an object to be generated in additive manufacturing, a representation of a slice of the object model bounded by two planes, the object model data comprising a plurality of initial polygons;

generate a mesh of polygons to represent the slice of the object model based on the initial polygons by:

defining a vertex of a slice polygon where a vertex of an initial polygon intersects a plane of the two planes;

defining a vertex of the slice polygon where an edge of an initial polygon intersects a plane of the two planes;

defining an edge of the slice polygon where a face of an initial polygon intersects a plane of the two planes;

maintaining any initial polygon which is wholly contained within the slice polygon; and maintaining any initial polygon edge or edge segment within the slice polygon;

generate a mapping between the object property data and the generated polygons; and cause the object to be generated via additive manufacturing based on the mapping between the object property data and the generated polygons.

14. The system according to claim 13, wherein the mesh of polygons is generated utilizing any edges and vertices of a mesh representing the object defined in the object model data which lie within the slice.

15. The system according to claim 13, wherein the instructions are executable by the processor to further:

generate control instructions to generate the object using the generated mesh of polygons and the mapping, wherein the object is caused to be generated via additive manufacturing by causing an additive manufacturing apparatus to execute the control instructions.

16. The system according to claim 15, wherein the additive manufacturing apparatus is part of the system.

17. The system according to claim 15, wherein the additive manufacturing apparatus is not part of the system.

* * * * *